Figure 1:
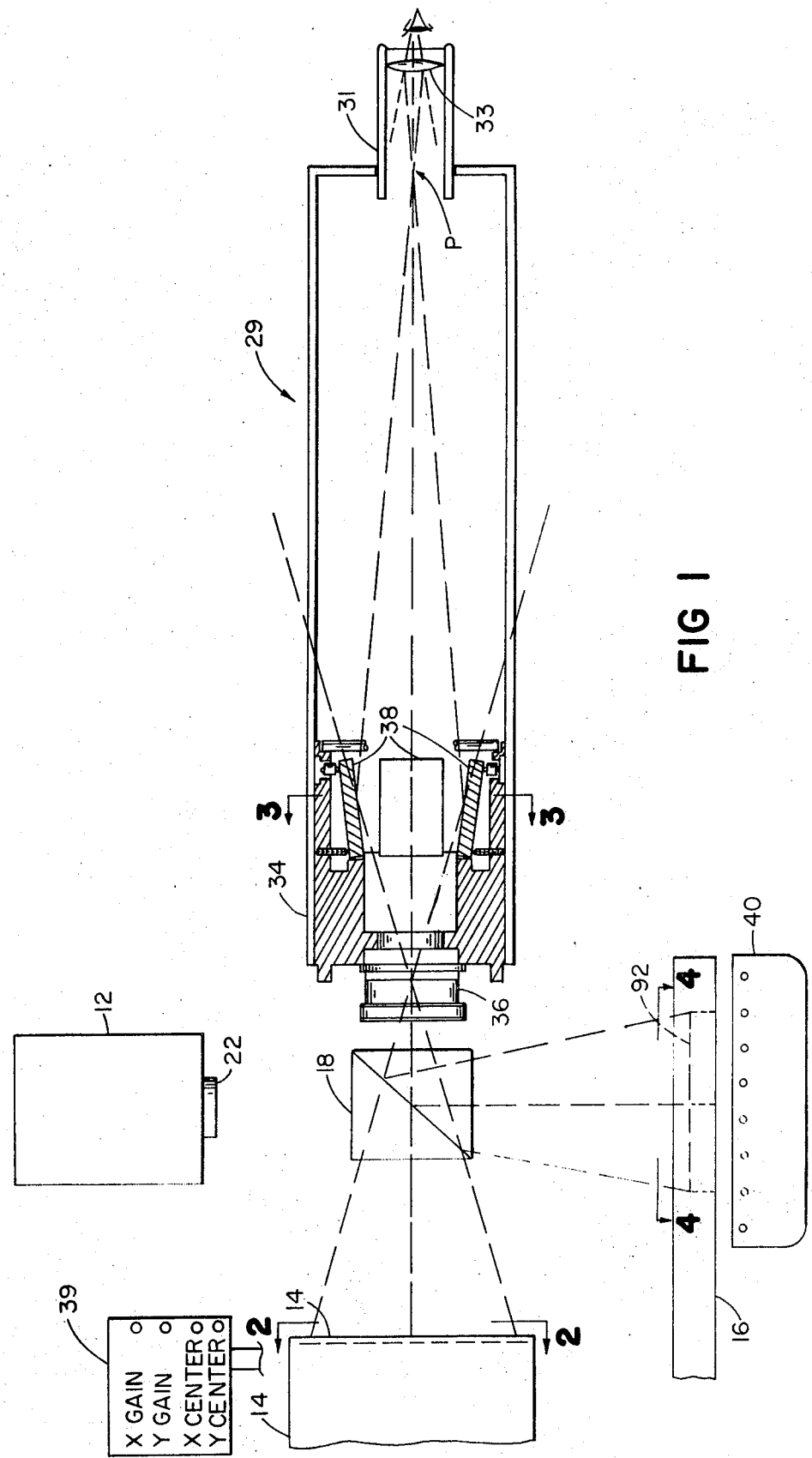

United States Patent
Nielsen

[15] 3,688,654
[45] Sept. 5, 1972

[54] ALIGNMENT SYSTEM USEFUL IN COMPUTER OUTPUT MICROFILM RECORDERS

[72] Inventor: Asger T. Nielsen, San Diego, Calif.

[73] Assignee: Compufoto, Inc., Wellesley Hills, Mass.

[22] Filed: May 19, 1970

[21] Appl. No.: 38,772

[52] U.S. Cl. .................... 95/1.1, 353/37, 346/23, 346/110
[51] Int. Cl. ............................................. G03l 17/24
[58] Field of Search ............ 353/30, 37; 346/23, 110; 95/1.1

[56] References Cited

UNITED STATES PATENTS 3,495,267  2/1970  Brodie ........................ 346/23

Primary Examiner—Samuel S. Matthews
Assistant Examiner—E. M. Bero
Attorney—John Noel Williams

[57] ABSTRACT

Alignment of multiple images for photographing, especially microfilming where one image is variable in centering and in width, and an assembled, magnified image of spaced indicia are view for judging the degree and nature of misalignment. A computer output microfilm device is shown employing a cathode ray tube display of alphanumeric characters superimposed on projected forms overlay or hard copy. Manipulation of X, Y deflection and gain of the cathode ray tube is made simple by viewing a magnified, assembled image of spaced indicia carried by the cathode ray tube and the other display. Preferably the rays of the indicia cross before reaching the eyepiece, matching the directions of viewed misalignment with the needed corrections.

10 Claims, 9 Drawing Figures

ALIGNMENT SYSTEM USEFUL IN COMPUTER OUTPUT MICROFILM RECORDERS

This invention concerns an alignment device useful for aligning computer output microfilm recorders (COM units) where two images are superimposed one on another, for instance to obtain a microfilm photograph of alphanumeric data generated from computer signals superimposed on a business form furnished by the COM unit.

An object of this invention is to provide an alignment system that enables the operator to perform a faster and more convenient alignment of the COM unit.

A further object of the invention is to provide an alignment system that will avoid errors due to parallax originating from the glass plate of the cathode ray tube.

A further object is to provide an alignment system that will enable persons without special skills to successfully complete an alignment.

A further object of the invention is to facilitate the merger of hard copy input with computer generated data and with forms information stored in the COM unit.

A further object of this invention is to avoid such difficulties, associated with the use of borescopes inserted in the film path inside the camera, as the great difference between the light intensity of a center beam and that of the corner beams.

In its broadest aspect this invention provides the means for selecting at least two significant widely separated areas for the alignment of a computer output microfilm unit, such as two diagonally opposite corners, or one corner and one center area, and means for bringing these areas close together, visually, so that they may be viewed and simultaneously aligned.

The invention features selection of the significant areas by mirrors located at strategically important positions, which assemble an image of components that come from widely separated regions of the cathode ray tube. This image is magnified by the use of a simple eyepiece. In a preferred embodiment of this invention, the mirrors are positioned in such a way that beams from widely separated points on the CRT cross each other before they are focused to create an aerial image. As a result, the image will have the same orientation as the image on the CRT. Therefore, the alignment of one image with another is less confusing, because when the alignment controls are turned the resulting movement will be in the expected direction. Another feature of this invention is that a single fixed eyepiece can be used to view images originating far apart on the CRT.

Figure 2:
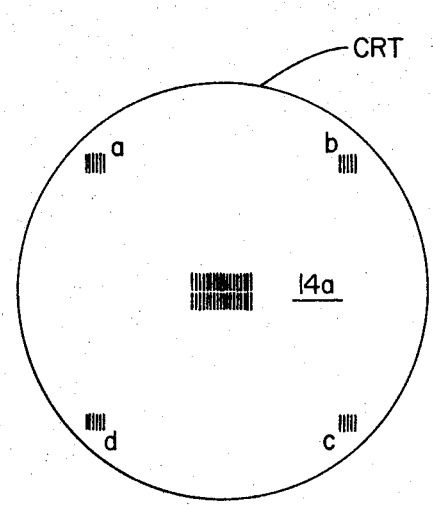
Figure 3:
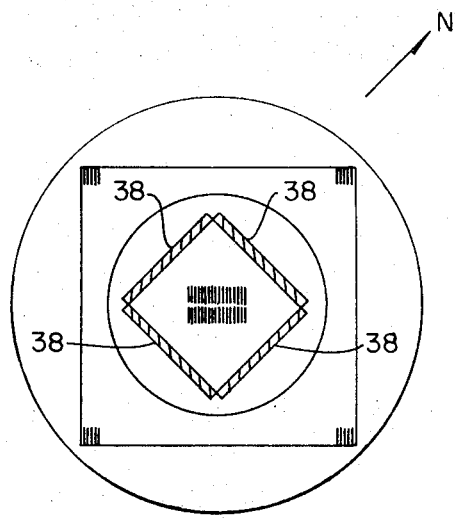
Figure 4:
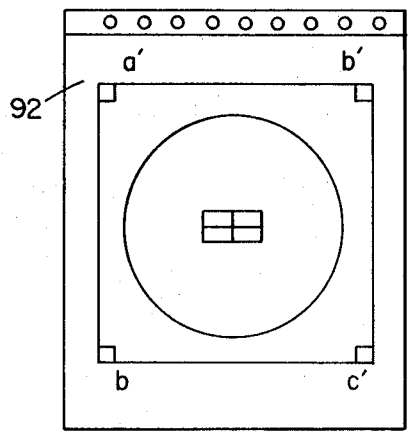

In the drawings, FIG. 1 is a longitudinal cross-sectional and, in part, diagrammatic view of a preferred embodiment of the alignment device and other components of a microfilm recorder;

FIGS. 2, 3, and 4 are transverse cross-sectional views taken on lines 2—2, 3—3, and 4—4 respectively of FIG. 1; and FIGS. 5-9 are representative views as seen by an operator during adjustments of the COM unit.

Referring to FIG. 1, the main components of the alignment system are the cathode ray tube 14 with display face 14a, the form projector consisting of form carrier 16, glass slide 92 and form lamp 40, the beam combiner 18, the camera 12 with camera lens 22 and the monitor 29. The monitor consists of an outer tube 34 with a smaller tube 31 inserted at one end. The tube 31 can slide in and out of the larger tube, and contains a simple eyepiece consisting of a single lens 33. At the lower end of the monitor is a lens 36. Immediately above lens 36 inside the monitor are four mirrors 38 of which three can be seen in the cross sectional view of the monitor, FIG. 1. FIG. 3, a view in the direction of the axis of the monitor towards the cathode ray tube taken on cross-section 3—3, shows the location of the four mirrors.

FIG. 2 illustrates a test image that is produced on the cathode ray tube face plate 14a when the microfilm recorder is in test mode.

FIG. 4 is an illustration of one of the form slides 92 that can be mounted in form carrier 16 and moved into operative position when the microfilm recorder is in test mode. It will be seen that the format generated on the cathode ray tube 14a and illustrated in FIG. 2 resembles the slide 92, FIG. 4. The alignment of the computer output microfilm recorder is complete when the image on the cathode ray tube is exactly superimposed on the image from the form slide, accomplished by adjusting the CRT controls 39 in FIG. 1. Four controls are provided to permit the adjustment of X and Y gain and X and Y centering of the image on the cathode ray tube 14a.

Figure 5:
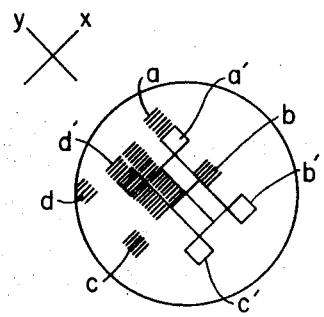
Figure 8:
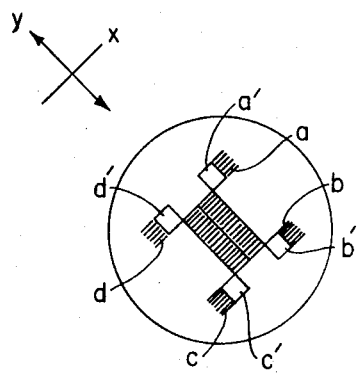
Figure 9:
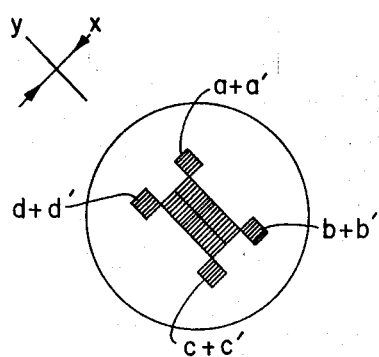

FIG. 3 also shows the format on the cathode ray tube to indicate the relative position of the mirrors 38 with respect to the corners of the format. The four mirrors 38 deflect the light from the four corners of the format on the CRT 14 and from the form 92 in such a way that four images are formed very close to the axis of the monitor. This is illustrated in FIG. 9. In the absence of the four mirrors, the aerial images of the four corners would be formed at widely separated points, as indicated in FIG. 1 by the dashed lines 50. The positions of the mirrors are such that the corner beams cross over (at point $p$) below the point at which the aerial image is in proper focus. This provides a second inversion of the image after the inversion by lens 36 and the image will therefore be upright. A typical alignment procedure is best described with reference to FIGS. 5, 6, 7, and 8. An examination of FIG. 5 shows that the areas $a$, $b$, $c$, and $d$ from CRT face 14a are misplaced with respect to areas $a'$, $b'$, $c'$, and $d'$ from form 92. The Y-centering control is moved first, in such a direction that areas a and b on FIG. 5 move to a position between $a'$ and $b'$, as shown in FIG. 6.

Figure 6:
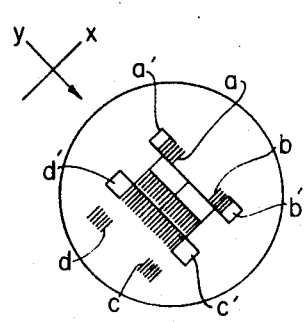
Figure 7:
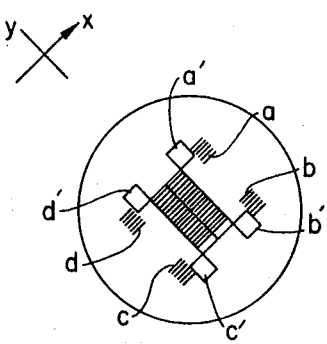

Next, the X center control is turned in such a way that the two areas b and c in FIG. 6 move to the positions shown in FIG. 7. One can also utilize the four areas in the center of the format as a guide, and as illustrated in FIG. 7 they now are superimposed exactly on the four areas in the center of the form 92.

Since the areas $a$, $b$, $c$, and $d$ on FIG. 7 fall outside the corresponding rectangles originating from form 92, it is now necessary to adjust the X and Y gain controls. The Y gain is adjusted first as shown in FIG. 8, with the result that areas $a$, $b$, $c$, and d are now lined up with areas $a'$, $b'$, $c'$, and $d'$ respectively.

The final adjustment is made on the X gain control, to move areas $a$, $b$, $c$, and $d$ closer to the center as illustrated in FIG. 9.

Without the mirrors to deflect the several beams to form a single image of the display, the process of alignment which in this illustration required four individual steps would have required thirty to forty steps. To accomplish such a process would require moving eyepiece 33 in a direction perpendicular to the axis of the system in order to view each individual corner, one at a time, since the images of these corners would be widely separated, as shown in FIG. 1. Thus, the device of this invention greatly simplifies and abbreviates the necessary procedure for alignment.

It will be noted that tube 31, carrying eyepiece lens 33, may be moved axially with respect to tube 34, thus providing a simple and easy way to adjust for the best possible focus.

Obviously, in place of, or in addition to the forms overlay 92, there can be an input from other hard copy devices by substitution of a suitable input station for form 92, or by providing additional stations with additional combiners. Alignment of these, too, can advantageously employ the principles of the invention.

What is claimed is:

1. A system for combining and aligning the image produced by a first variable width display device with the image produced by a second display device for the purpose of producing a properly correlated composite image, said system comprising means providing for said two display devices corresponding visible reference indicia adapted for superposition, a beam combiner for combining images from said display devices, adapted to transmit said combined images in two directions, a monitor for receiving said combined images transmitted in the second said direction, having optical means for forming an assembled aerial image of selected separated portions of said reference indicia, and having an eyepiece suitably placed to permit an operator to view said assembled image, said optical means including a redirection means for receiving light rays from one of said selected portions of indicia passing from said combiner and for redirecting said lights rays toward said eyepiece in a path to produce an image of said portion of indicia more closely related in said assembled aerial image to the image of a second portion of said indicia than the proportionate spacing of said portions of said reference indicia on said display devices said adjustment means associated with said first display device for moving the center of the corresponding display and for varying the dimensions of said display, whereby said images from said display devices may be made to correspond in position and size.

2. The system of claim 1 wherein said first display device is connected to a computer output and wherein the image produced by said first display device comprises a large number of alphanumeric characters of small size.

3. A system for combining and aligning the image produced by a first variable width display device with the image produced by a second display device for the purpose of producing a properly correlated composite image, said system comprising means providing for said two display devices corresponding visible reference indicia adapted for superposition, a beam combiner for combining images from said display devices, adapted to transmit said combined images in two directions, a monitor for receiving said combined images transmitted in the second said direction, having optical means for forming an assembled aerial image of selected separated portions of said reference indicia, and having an eyepiece suitably placed to permit an operator to view said assembled image, said optical means comprises mirrors, each so placed so as to receive from said combiner means images of corresponding said indicia from selected corresponding portions of said display devices, and to enable said images to be received simultaneously with the images from each of the other said mirrors for observation through said eyepiece, and adjustment means associated with said first display device for moving the center of the corresponding display and for varying the dimensions of said display, whereby said images from said display devices may be made to correspond in position and size.

4. The system of claim 1 wherein said corresponding indicia include at least one peripheral indicium spaced from the center of said first display device with a corresponding peripheral indicium on said second display device, and at least one second indicium spaced from said first indicium on said first display device and a corresponding second indicium on said second display device.

5. The system of claim 4 wherein said second indicium is generally centered on said first display device, and said corresponding second indicium is generally centered on said second display device.

6. The alignment system of claim 1 wherein said reference indicia comprise indicia generally centered on said first display device with corresponding indicia generally centered on said second display device, and a plurality of corner indicia generally spaced about 90° apart and spaced equally from the center of said first display device, and corresponding corner indicia on said second display device.

7. The system of claim 6 wherein said optical means of said monitor comprises four redirection means placed tangent to a circle and equally spaced apart, the images of said generally centered indicia are transmitted through the interior of said circle, and said redirecting means direct the images of said corner indicia to form with the images of said generally centered indicia an assembled aerial image for viewing through said eyepiece.

8. The system of claim 1 wherein said first display device is a cathode ray tube displaying alphanumeric information in response to digital input for microfilm recording and said eyepiece is positioned to magnify the image of the indicia larger than the actual indicia appearing in the face of the cathode ray tube.

9. The system of claim 8 wherein said CRT is equipped with means for adjusting X and Y coordinate centering and X and Y coordinate gain operable while viewing said indicia through said eyepiece.

10. The system of claim 8 wherein the rays from the spaced indicia cross before reaching the eyepiece, thereby matching the direction of viewed misalignment with the needed correction.

* * * * *